ent invention for securing a vehicle to a transportation
United States Patent Office 3,071,348
Patented Jan. 1, 1963

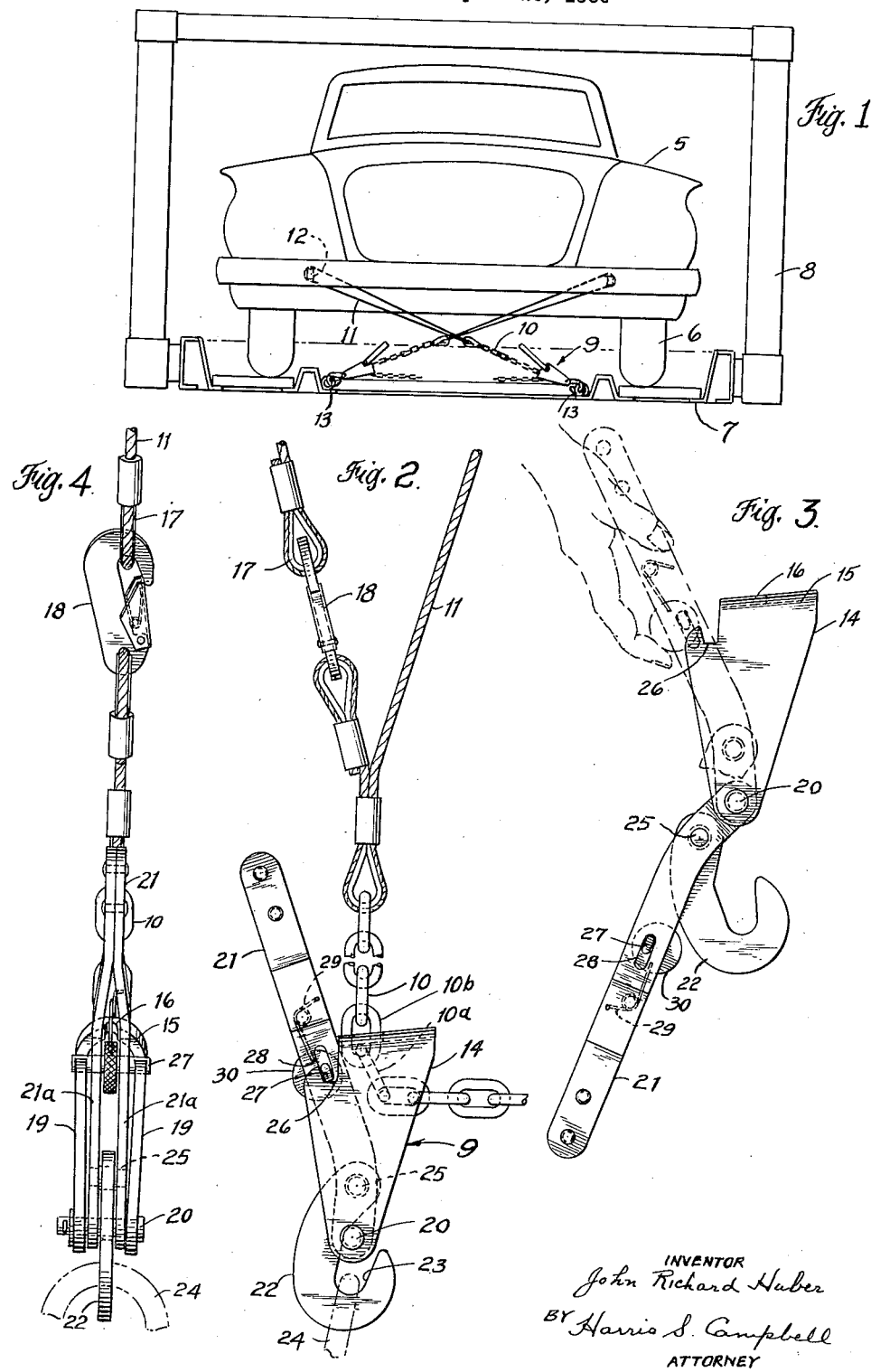

3,071,348
ADJUSTING AND TENSIONING DEVICE
John Richard Huber, Holicong, Pa., assignor to Eastern Rotorcraft Corporation, Doylestown, Pa., a corporation of Pennsylvania
Filed Apr. 28, 1960, Ser. No. 25,448
4 Claims. (Cl. 254—78)

This invention relates to a tension securing device and is particularly concerned with a device which uses a chain member as a means for adjustment.

Devices of the general nature of the present invention are often used to secure cargo in position to prevent undesired movement while it is being transported. It is the primary object of the present invention to provide a simplified device having a structure which permits engagement with a link of a chain member as a means for length adjustment to fit the particular application where it is being used.

It is a further object of the invention to provide a relatively compact adjustable device which is suitable for use in restricted spaces and which incorporates a means for introducing initial tension in the device by means of a handle having a toggle action which is transferred to an anchoring hook attached to the handle.

Another object of the invention is the provision of an anchoring hook which is suitably shaped to cooperate with the handle member in a fashion such that when the unit is tensioned the hook is drawn up into a position close to the device where the opening to the hook is blocked. In this way, the removal of the anchoring means from the hook is prevented without the need for keepers and the like.

A still further object of the invention is the provision of latch means for retaining the handle in a closed position in which the handle prevents the chain from being removed while the handle is in closed position.

How these and other objects and advantages of the invention are accomplished will be clear by reference to the drawings in which:

FIGURE 1 illustrates the use of the device of the present invention for securing a vehicle to a transportation pallet.

FIGURE 2 shows a side view of the device of the present invention drawn to an enlarged scale.

FIGURE 3 shows a view of the main structure and mechanism of the device with the parts in open relationship.

FIGURE 4 is a view of the device in edgewise elevation.

Referring to the figures it will be seen that FIGURE 1 shows an automotive vehicle 5 with its wheels 6 mounted on a special pallet 7 for transportation as by steamship, rail car or truck. The frame 8 provides for placing another pallet above the first pallet to conserve space during transportation. To secure the vehicle 5 to the pallet 7 a pair of tensioning devices are shown. Each device 9 has a chain member 10 connected to it and is also equipped with a cable portion 11 which extends around a suitable structural element 12 such as the member which supports the bumper of the automobile. The lower end of the tiedown device is attached to an anchor fitting 13. By supplying a pair of tiedown units at the front and rear ends of the automobile as illustrated any appreciable movement is prevented during shipment.

Referring to FIGURES 2, 3 and 4, the device 9 includes a body member or frame 14 having an upper end which is preferably curved as indicated at 15, the curvature being such that the end of a chain link, such as link 10a, will fit the inside curvature of the frame 14. To permit insertion of the link 10b in edgewise position as illustrated in FIGURE 2, a slot 16 is provided having a width sufficient to receive the link. For the particular application illustrated a cable 11 is attached to the chain and may be passed over the engaging structure and formed into a loop by connecting the terminal eye 17 into the hook 18.

The frame 14 is preferably made in a U-shaped formation with side plates 19 extending downwardly to the end opposite the curved end 15 where pivot member 20 is provided to attach a handle 21. Handle 21 is preferably made in a forked configuration at its lower end where it is mounted between the side plates 19 by the pivot 20. A hook or terminal element 22 is positioned with one end between the fork legs 21a of the handle 21. Hook element 22 is provided with an opening 23 to engage any suitable anchor fitting such as shown by chain dotted outline 24. The main portion of hook element 22 extends upwardly and is connected to the fork legs 21a of the handle 21 by means of pivot 25. Pivot 25 is located in offset relationship with respect to the handle supporting pivot 20. It will be noted that the hook 22 and the handle 21 are shaped so that in closed position of the handle as shown in FIGURE 2 the pivot 25 is approximately in the line of pull between the chain 10, the pivot 20 and the anchor fitting 24.

To provide for the retention of the handle in the position shown in FIGURE 2 the side plates 19 of the frame 14 incorporates notches 26. The handle is equipped with a cooperating latch device which includes bar 27 extending beyond the legs 21a of the handle to engage the notches 26. A slot 28 in the handle 21 permits movement of the latch part 27 and it is urged to the latched position by means of spring 29. A projecting member 30 attached to the latch bar 27 allows the latch to be moved manually for release. When locking the latch snaps into position by virtue of the rounded shape leading into notches 26.

It will be observed in FIGURE 3 that the handle 21 and hook 22 are shown in open position. Here the hook 22 may engage a suitable anchoring fitting. Also with the handle in this position the tension member including chain 10 may be pulled tight and the nearest link 10b may be inserted in the slot 16. The device is then ready for closing which action also induces tensioning. To close the device the handle is swung from the full line position as shown in FIGURE 3 to the dotted outline position which brings the handle close to the side of the frame 14. The handle is then moved until it is in latched position as shown in FIGURE 2. In moving from the open to the closed position the handle draws the hook element 22 toward the frame 14 by an amount slightly less than twice the distance between the pivots 20 and 25. This provides for tensioning of the unit and at the same time draws the hook element 22 up into position where it is close to the end of the frame 14 and thus the hook opening is blocked to prevent removal of the anchor fitting while the device is closed. Bringing the handle to latched position also places it in position where it prevents removal of the chain link 10b from the slot.

From the foregoing it will be evident that I have provided a tiedown device having a relatively simple structure but which provides for a large degree of latitude in the length adjustment by means of the selection of the proper link in a chain portion. The few number of parts are arranged in proper relationship to provide that the handle not only induces the tightening action into the system but also positions the hook member to prevent removal of the anchoring member and at the same time the handle serves as a lock to prevent disengagement of the chain link.

I claim:
1. A load securing device having a chain portion, a frame member of unitary construction bent in the form of a U-shape having the inside curvature of the U-shape portion approximating the shape of the outside end of a chain link, the end of said frame member having a transversely directed slot shaped to fit a chain link in edgewise position while the link remains in tension alignment with the loaded portion of chain, a handle member, a pivot at one end of said handle member connecting it to the end of said frame member opposite said slot, said handle having a fork at the pivoted end, a hook element supported between the forked end of said handle member and having a pivot connecting it to said handle member at a point close to said pivot mounting said handle on said frame member, said handle being movable about its pivoted end to swing it alongside said frame, said hook element being positioned by said handle to lie with a portion extending beyond said frame member when the handle is in closed position, said hook element further incorporating an open throat which is obstructed by said handle and said frame when the handle is in closed position.

2. A securing and tensioning device having a chain portion, a frame having flat plate side members open at one end and having an interior closed shape at the other end to fit the shape of the end of a chain link, said frame incorporating a slot at the closed end thereof, said slot extending inwardly from the edge of said frame and having a width to fit a chain link held in edgewise position by a portion of chain extending from said frame under a tension load, a handle having separated forks, the outside width of said handle fitting between the sides of the frame, a pivot connecting the forked end of said handle to the end of said frame opposite said slot, a terminal element proportioned to fit between the forked end of said handle, a pivot connecting said terminal element to said handle at a point close to the pivoted end of said handle and a movable latch device attached to said handle to hold the handle in closed position with the forked legs inside said frame, said side frame members having edge notches near the closed end to engage said movable latch device and move it during closing movement of the handle.

3. A tensioning and adjusting device having a chain portion, a frame member having a chain engaging slot at one end, a handle attached by a pivot to the other end of said frame member remote from said slot, an open hook element having a pivot connecting it to said handle at a point slightly spaced from the frame attaching pivot, said handle being swingable from an open position with respect to said frame to a closed position, said hook element being positioned remote from said frame in the handle open position, said hook element being drawn into close proximity with the end of said frame when the handle is in closed position, said handle further being located close to the end of said chain engaging slot when in closed position, a movable latch part supported on said handle and said frame member having a cooperating edge notch to retain said handle in closed position.

4. A tensioning and adjusting device having a chain portion, a frame of unitary construction having side plates and a chain link engaging part, a transverse slot in said link engaging part of said frame to permit edgewise entry of a chain link while the link is in tension alignment with respect to the loaded links, a handle member having a pivot to support it at the end of said frame opposite said link engaging part, said handle being swingable toward or away from said frame, said frame having a notch in the edge thereof and said handle having a movable latch positionable within said notch to retain said handle in latched position, a hook structure having a pivotal connection to said handle at a point between the pivot connecting said handle to said frame and said latch, the spacing of said pivots thus providing for moving said hook toward said frame to provide a retracted position where the hook structure opening is obstructed by the end of said frame.

References Cited in the file of this patent

UNITED STATES PATENTS

| | | |
|---|---|---|
| 398,714 | Farr | Feb. 26, 1889 |
| 2,298,115 | Felton et al. | Oct. 6, 1942 |
| 2,919,895 | Johnson | Jan. 5, 1960 |